(12) United States Patent
Fukushima

(10) Patent No.: US 9,772,000 B2
(45) Date of Patent: Sep. 26, 2017

(54) PISTON AND SHOCK ABSORBER INCLUDING PISTON

(71) Applicant: KAYABA INDUSTRY CO., LTD., Tokyo (JP)

(72) Inventor: Masaru Fukushima, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/762,209

(22) PCT Filed: Feb. 4, 2014

(86) PCT No.: PCT/JP2014/052553
§ 371 (c)(1),
(2) Date: Jul. 21, 2015

(87) PCT Pub. No.: WO2014/123114
PCT Pub. Date: Aug. 14, 2014

(65) Prior Publication Data
US 2015/0345584 A1    Dec. 3, 2015

(30) Foreign Application Priority Data

Feb. 6, 2013  (JP) ................. 2013-020962

(51) Int. Cl.
*F16F 9/32* (2006.01)
*F16F 9/348* (2006.01)
*F16F 9/36* (2006.01)

(52) U.S. Cl.
CPC .......... *F16F 9/3482* (2013.01); *F16F 9/3214* (2013.01); *F16F 9/368* (2013.01)

(58) Field of Classification Search
CPC ........ F16F 9/3214; F16F 9/0227; F16F 9/368; F16F 2230/02; F16F 9/3482; F16F 9/3485; F16J 1/09; F16J 1/001
USPC ........................... 188/322.22; 92/181 P, 184
See application file for complete search history.

(56) References Cited

U.S. PATENT DOCUMENTS

| | | | | |
|---|---|---|---|---|
| 3,212,411 A * | 10/1965 | Storms | ............... | F04B 39/0005 |
| | | | | 285/909 |
| 3,730,305 A * | 5/1973 | Fouts | ................... | F16F 9/3214 |
| | | | | 188/322.15 |
| 5,325,942 A * | 7/1994 | Groves | ............... | F16F 9/3484 |
| | | | | 188/282.6 |
| 6,371,264 B1 * | 4/2002 | Deferme | ............... | F16F 9/516 |
| | | | | 188/282.6 |

(Continued)

FOREIGN PATENT DOCUMENTS

| | | | | |
|---|---|---|---|---|
| CN | 201858350 U | | 6/2011 | |
| DE | 102004050732 | * | 6/2005 | ............... F16F 9/34 |

(Continued)

OTHER PUBLICATIONS

EPO machine translation WO 97/11289 A1, Mar. 1997.*

*Primary Examiner* — Thomas J Williams
(74) *Attorney, Agent, or Firm* — Rabin & Berdo, P.C.

(57) ABSTRACT

Provided on one plane of an annular piston are a sheet surface on which a leaf valve is seated and a supporting part constructed of a slope part and a flange part, and provided on the other plane is a leg part having a depression on an edge part. When two pistons are axially stacked, the sheet surface of one of the pistons is contained inside the depression of the other piston, and the sheet surface of the one piston is protected.

5 Claims, 5 Drawing Sheets

(56) References Cited

U.S. PATENT DOCUMENTS

| | | | |
|---|---|---|---|
| 6,886,670 B2 * | 5/2005 | Holiviers | F16F 9/3214 |
| | | | 188/322.14 |
| 2006/0118372 A1 * | 6/2006 | Hammer | F16F 9/34 |
| | | | 188/284 |

FOREIGN PATENT DOCUMENTS

| | | | | |
|---|---|---|---|---|
| DE | 10318018 B4 * | 6/2015 | | F16F 9/3405 |
| FR | WO 9711289 A1 * | 3/1997 | | F16F 9/3214 |
| JP | 02-025743 U | 2/1990 | | |
| JP | 08-135713 A | 5/1996 | | |
| JP | 2000-257659 A | 9/2000 | | |
| JP | 2001-012532 A | 1/2001 | | |
| JP | 5588497 B2 * | 9/2014 | | F16F 9/3214 |
| WO | WO 2014-077265 A1 | 5/2014 | | |

* cited by examiner

PISTON AND SHOCK ABSORBER INCLUDING PISTON

TECHNICAL FIELD

The present invention relates to a piston and a shock absorber including a piston.

BACKGROUND ART

JP8-135713A discloses a shock absorber. This shock absorber includes a cylinder, a piston rod inserted axially movable within the cylinder, and an annularly shaped piston retained on an outer circumference of the piston rod. The piston is slidably in contact with an inner circumference surface of the cylinder, and partitions two chambers in which working fluid is filled within the cylinder.

A passage that communicates the two chambers, a window provided at an outlet of the passage, and a valve seat surrounding the window are formed in the piston. At least one annular plate shaped leaf valve is stacked on the piston, and an outer circumference part of the leaf valve is made detachable from a seat surface of the valve seat. When external force is applied to the shock absorber and the piston moves inside the cylinder together with the piston rod, the working fluid in one of the chambers to which pressure is applied by the piston pushes open the leaf valve, flows through the passage and moves to the other chamber. As a result, the shock absorber generates damping force caused by resistance of the leaf valve when the working fluid passes through the passage.

SUMMARY OF INVENTION

The shock absorber is completed by undergoing a parts manufacturing step of manufacturing each of parts constructing the shock absorber, such as the cylinder, piston rod, piston, and leaf valve, and an assembly step of assembling each of the parts manufactured in the manufacturing step.

The piston is formed as an annular shape. For this reason, after manufacturing the piston by undergoing the parts manufacturing step, it is more useful to handle pistons 100 in a vertically (axially) stacked manner, as shown in FIG. 5, such as when the pistons are stored as stock awaiting for the assembly step or are being transferred to the assembly step. However, if the pistons 100 are stacked vertically, a leg part 102 serving as a lower end of an upper piston 100 comes into contact with a sheet surface 101 that is formed on an upper side of a lower piston 100. The leg part 102 may cause damage to the sheet surface 101, which thus may disable the achievement of a desired damping force.

It is an object of the present invention to provide a piston capable of protecting a sheet surface on a piston of one of stacked pistons by preventing the sheet surface from coming into contact with a leg part of another piston when the pistons are axially stacked, and a shock absorber including these pistons.

According to one aspect of the present invention, an annular piston on which an annular plate shaped leaf valve is stacked on a one side of the piston in an axial direction is provided. The piston includes a sheet surface on which the leaf valve is seated, the sheet surface being formed on the one side of the piston, a leg part formed on an outer circumference part of an other side of the piston in the axial direction, the leg part standing along a circumferential direction of the outer circumference part, and a supporting part provided on the outer circumference of the sheet surface along the circumferential direction. When the piston is axially stacked on another piston, the leg part of the piston comes into contact with the supporting part of the another piston, and the sheet surface of the another piston is contained inside a depression of the piston. The depression is provided on an inner circumference side of an edge part of the leg part on the other side of the piston.

DESCRIPTION OF EMBODIMENTS

Hereinafter, the present invention is described based on an illustrated embodiment.

Reference signs applied identically across several drawings indicate the same components or corresponding components.

Figure 1:
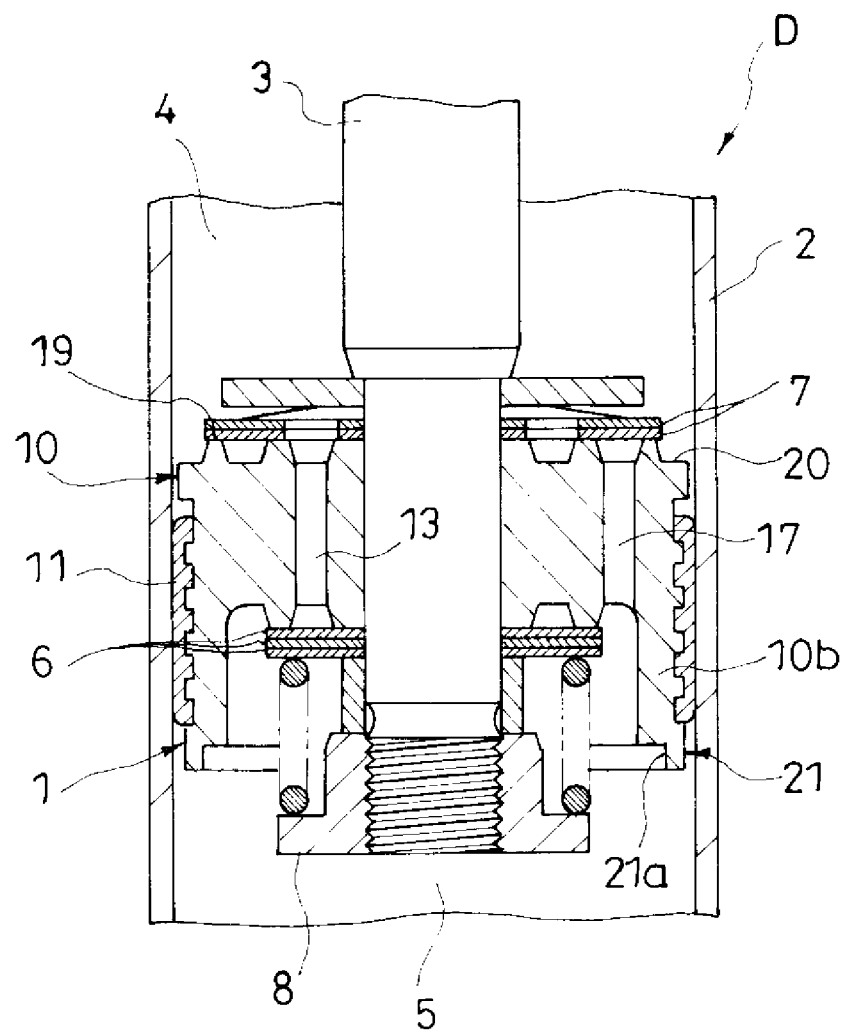
FIG. 1 is a vertical cross sectional view showing a main part of a shock absorber including a piston according to an embodiment of the present invention.

As shown in FIG. 1, a piston 1 is a annular-shaped piston whose one side is stacked with an annular plate shaped leaf valve 7. The piston 1 includes a sheet surface 19 formed on the one side of the piston, on which the leaf valve 7 is seated, and includes a leg part 10b on an outer circumferential portion on an other side of the piston 1, provided standing along a circumferential direction. The outer circumference of the sheet surface 19 has a supporting part 20 provided along the circumferential direction. An edge part 21 of the leg part 10b is provided with a depression 21a on its inner circumference. This allows for the leg part 10b on one of the stacked pistons 1 to avoid the sheet surface 19 of the other piston 1 and come into contact with the supporting part 20 when the pistons 1 are axially stacked, and the sheet surface 19 is contained within the depression 21a.

The piston 1 is used in a shock absorber D of a single rod single cylinder type. The shock absorber D includes a cylinder 2, a piston 1 to be inserted slidably movable inside the cylinder 2, a piston rod 3 whose one end is connected to the piston 1 and is inserted movable inside the cylinder 2, and an expansion chamber 4 and a compression chamber 5 defined within the cylinder 2 and partitioned by the piston 1. The expansion chamber 4 and compression chamber 5 are filled with working fluid constituted of fluid such as hydraulic oil. The working fluid may be, other than hydraulic oil, fluids for example water, aqueous solution and like solution.

A free piston (not illustrated) is inserted slidably movable inside the cylinder 2, and partitions an air chamber (not illustrated) that compensates a change in volume within the cylinder by the volume of the piston rod 3 in the cylinder 2. The air chamber may also be partitioned by an elastic partition such as a bladder. Moreover, the shock absorber D may be made as a double cylinder by providing an outer cylinder on the outer circumference of the cylinder 2, and form a reservoir for containing working fluid and gas in a tubular gap formed between the cylinder 2 and the outer cylinder. In this case, the reservoir allows for compensating the change in volume within the cylinder by the piston rod volume. Furthermore, the shock absorber D may be not a single rod type but a double rod type.

On both sides of the piston 1, a plurality pieces of annular plate shaped leaf valves 6 and 7 are stacked, respectively. Inner circumferential parts of the leaf valves 6 and 7 are fixed to an outer circumference of the piston rod 3 at its end together with the piston 1 by a nut 8. In the following description, among the leaf valves 6 and 7, a leaf valve(s) stacked on a compression chamber side (mid-lower side of FIG. 1) is called an expansion leaf valve 6, and a leaf valve(s) stacked on an expansion chamber side (mid upper side of FIG. 1) is called a compression leaf valve 7.

The piston 1 includes an annular piston body 10 retained on the outer circumference of the piston rod 3, and a piston ring 11 attached to the outer circumference of the piston body 10 and is slidably in contact with an inner circumference surface of the cylinder 2.

Figure 2:
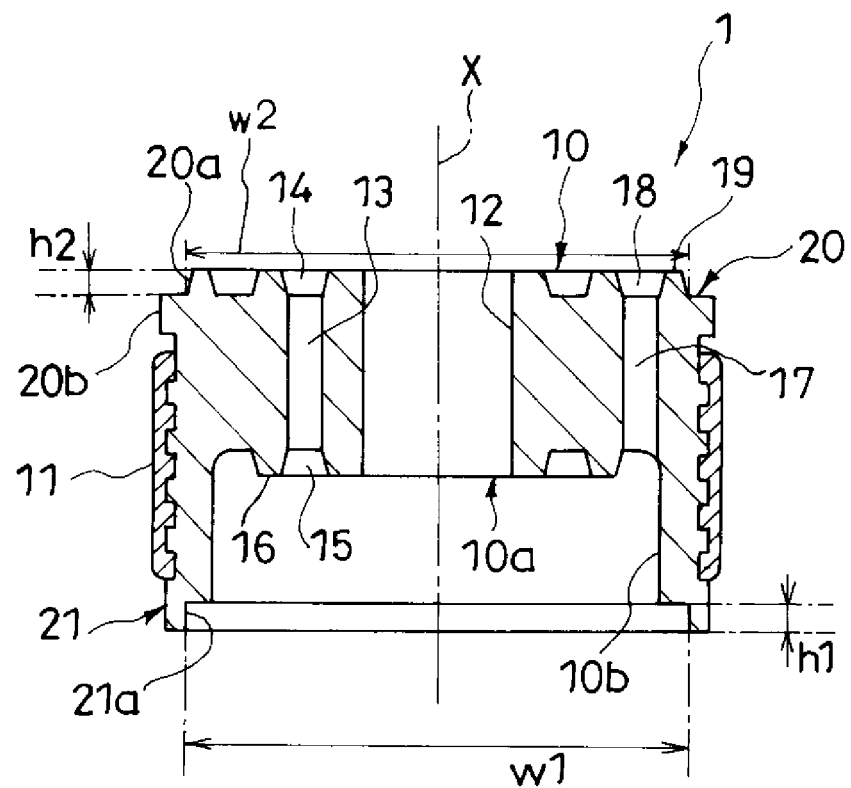
FIG. 2 is a vertical cross sectional view showing an enlargement of the piston of FIG. 1.

The piston body 10 includes, as illustrated in FIG. 2, a disk section 10a having a center hole 12 and passages 13 and 17, and an annular leg part 10b that extends from the outer circumference part of the disk section 10a toward the compression chamber (mid-lower side of FIG. 2). The center hole 12 is opened along a shaft center and through which the piston rod 3 is inserted. The expansion chamber 4 communicates with the compression chamber 5 via the passages 13 and 17. The passages 13 and 17 are constructed of an expansion passage 13 formed along an axial direction on an inner circumference side of the disk section 10a, and a compression passage 17 formed along the axial direction on an outer circumference side of the disk section 10a.

An annular open window 14, an annular window 18, an annular sheet surface 19, and a supporting part 20 are formed on the expansion chamber side of the disk section 10a (mid-upper side of FIG. 2). The annular open window 14 is provided on a starting end of the expansion passage 13. The annular window 18 is provided on a terminal of the compression passage 17. The annular sheet surface 19 encircles the window 18. The supporting part 20 projects out from the sheet surface 19 toward the outer circumference. On the other hand, a window 15 and an annular sheet surface 16 are formed on the compression chamber side of the disk section 10a (mid-lower side of FIG. 2). The window 15 is provided on a terminal of the expansion passage 13. The annular sheet surface 16 encircles the window 15. That is to say, the starting end of the compression passage 17 is positioned between the sheet surface 16 and the leg part 10b.

Each of the sheet surfaces 16 and 19 have a smooth surface; when the leaf valves 6 and 7 are seated on the sheet surfaces 16 and 19, the windows 15 and 18 become blocked and thus the passages 13 and 17 become closed, and when the leaf valves 6 and 7 separate from the sheet surfaces 16 and 19, the passages 13 and 17 are released. The expansion leaf valve 6 is positioned so as to not block the starting end of the compression passage 17, and the compression leaf valve 7 is formed to constantly not block the open window 14 of the expansion passage 13.

When the piston rod 3 relatively moves with respect to the cylinder 2 to the mid-upper side of FIG. 1 due to an input of an external force and the shock absorber D extends, the piston 1 moves to the mid-upper side of FIG. 1 together with the piston rod 3, which thus compresses the expansion chamber 4. As a result, the working fluid in the expansion chamber 4 pushes open the expansion leaf valve 6, flows through the expansion passage 13 and moves to the compression chamber 5. Accordingly, the shock absorber D generates damping force caused by resistance of the expansion leaf valve 6 of when the working fluid flows through the expansion passage 13.

On the contrary, when the piston rod 3 relatively moves with respect to the cylinder 2 to the mid-lower side of FIG. 1 due to an input of an external force and the shock absorber D is contracted, the piston 1 moves to the mid-lower side of FIG. 1 together with the piston rod 3, which thus compresses the compression chamber 5. As a result, the working fluid in the compression chamber 5 pushes open the compression leaf valve 7, flows through the compression passage 17 and moves to the expansion chamber 4. Accordingly, the shock absorber D generates damping force caused by resistance of the compression leaf valve 7 of when the working fluid flows through the compression passage 17.

An edge part 21 positioned on a side opposite to the disk part of the leg part 10b of the piston body 10 (mid-lower side in FIGS. 1 and 2) has its inner circumference uniformly expanded in diameter, thus forming a level difference surface at its boundary with the other parts. As a result, an annular depression 21a is formed along a circumferential direction on the inner circumferential side of the edge part 21. The supporting part 20 arranged on the opposite side of the leg part 10b in the piston body 10 includes, as shown in FIG. 2, a slope part 20a extending from the outer circumference of the sheet surface 19 towards the mid-lower side in FIG. 2 in a manner inclining outwards, and a flange part 20b extending outwards from the outer circumference of the slope part 20a. The flange part 20b extends in a perpendicular direction with respect to a center line X of the piston 1, and is arranged along the circumferential direction of the outer circumference of the sheet surface 19.

The depression 21a of the leg part 10b and the flange part 20b are positioned on the circumference of a concentric circle whose center is located on the center line X of the piston 1. Furthermore, an inner diameter w1 of the edge part 21 of the leg part 10b is set to be equal to or more than an inner diameter w2 of the flange part 20b, and an axial length h1 of the depression 21a is set to be longer than an axial length h2 of the sheet surface 19 projecting out from the flange part 20b. As a result, when the pistons 1 are stacked in the axial direction, the edge part 21 serving as the end of the leg part 10b of one of the stacked pistons 1 comes into contact with the flange part 20b of the supporting part 20 of the other piston 1, and the leg part 10b do not come into contact with the sheet surface 19.

The shapes and dimensions of the depression 21a and the supporting part 20 can vary as appropriate as long as the leg part 10b avoids the sheet surface 19 disposed on the opposite side of the leg part 10b and come into contact with the supporting part 20 when the pistons 1 are stacked in the axial direction. For example, the edge part 21 of the leg part 10b can come into contact with the slope part 20a. In this case, the axial length h1 of the depression 21a may be shorter than the axial length h2 of the sheet surface 19 that projects from the supporting part 20.

Figure 3:
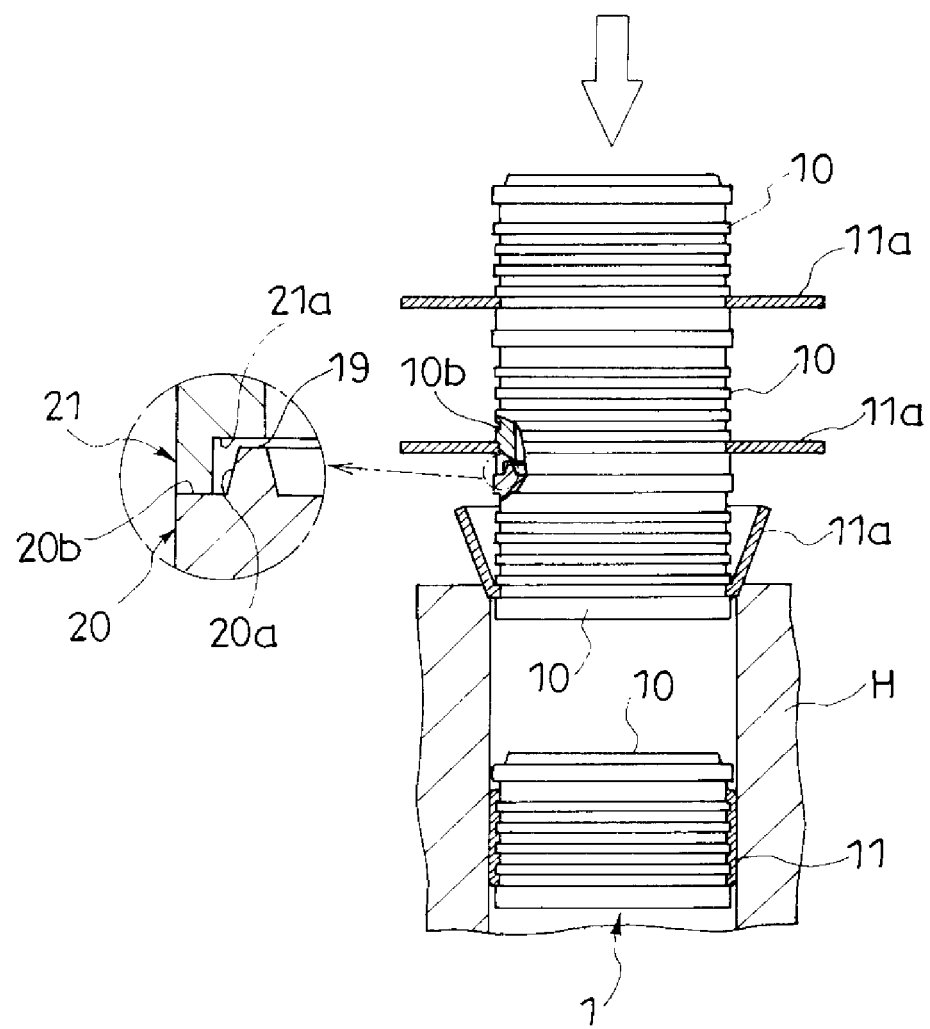
FIG. 3 is an explanatory view showing a molding process of a piston according to an embodiment of the present invention.

The piston ring 11 attached to the outer circumference of the piston body 10 is formed of resin, and is fixed to the outer circumference of the piston body 10 by mold formation. FIG. 3 is an explanatory view showing a molding process of a piston. First, an annular plate shaped resin sheet 11a serving as a base material of the piston ring 11 is engaged to the outer circumference of the piston body 10 at a mid-lower edge of FIG. 3. Next, the piston body 10 is pushed inside a heating cylinder H, and the resin sheet 11a is heated and deformed to be pressure welded onto the outer circumference of the piston body 10. Thereafter, the piston body 10 on which the resin sheet 11a is pressure welded is cooled. As described above, although the piston body 10 is pushed inside the heating cylinder H in a state in which a plurality of the piston bodies 10 are vertically stacked, since the leg part 10b avoids the sheet surface 19 and comes into contact with the supporting part 20, no force is applied to the sheet surface 19 even if force is axially applied to the stacked piston body 10. Therefore, it is possible to prevent the sheet surface 19 from becoming damaged.

Next describes the effect of the piston 1 in the present embodiment.

The piston 1 is an annular piston in which an annular plate shaped compression leaf valve (leaf valve) 7 is stacked on an expansion chamber side (the one side), and includes a sheet surface 19 formed on the expansion chamber side (the one side), on which the compression leaf valve 7 seats, and a leg part 10b that stands on an outer circumference portion on the compression chamber side (the other side) along the circumferential direction. The outer circumference of the sheet surface 19 is provided with a supporting part 20 along the circumferential direction, and a depression 21a is provided on the inner circumferential side of the edge part 21 of the leg part 10b. When the pistons 1 are stacked in an axial direction, the leg part 10b avoids the sheet surface 19 and comes into contact with the supporting part 20, and the sheet surface 19 is contained within the depression 21a.

Therefore, even if the pistons 1 are stored or carried vertically (axially) stacked, it is possible to prevent the sheet surface 19 of one of the pistons 1 to come into contact with the leg part 10b of the other piston 1. This allows for protecting the sheet surface 19, and thus can improve the convenience when storing and carrying the pistons 1.

Moreover, the supporting part 20 includes a slope part 20a that extends from the sheet surface 19 towards the compression chamber (the other side) to the outer circumference side in an inclined manner, and a flange part 20b extending outwards from the outer circumference of the slope part 20a. The flange part 20b extends in a perpendicular direction with respect to a center line X of the piston 1 and is disposed on the outer circumference of the sheet surface 19 along the circumferential direction.

The depression 21a and the flange part 20b are disposed on the circumference of a concentric circle whose center is on the center line X. Furthermore, the inner diameter w1 of the edge part 21 of the leg part 10b is set to be equal to or more than the inner diameter w2 of the flange part 20b, and the axial length h1 of the depression 21a is set to be longer than the axial length h2 of the sheet surface 19 projecting from the flange part 20b.

Therefore, it is possible to prevent the sheet surface 19 of one of the stacked pistons 1 from coming into contact with the leg part 10b of the other piston 1, and make the flange part 20b of the supporting part 20 in one of the pistons 1 to come into contact with the leg part 10b. This thus stabilizes the piston 1 when the pistons 1 are stacked.

Furthermore, the edge part 21 and the flange part 20b of the leg part 10b are formed annularly, so when the pistons 1 are stacked, it is possible to increase the contacting area between the leg part 10b and the supporting part 20.

Figure 5:
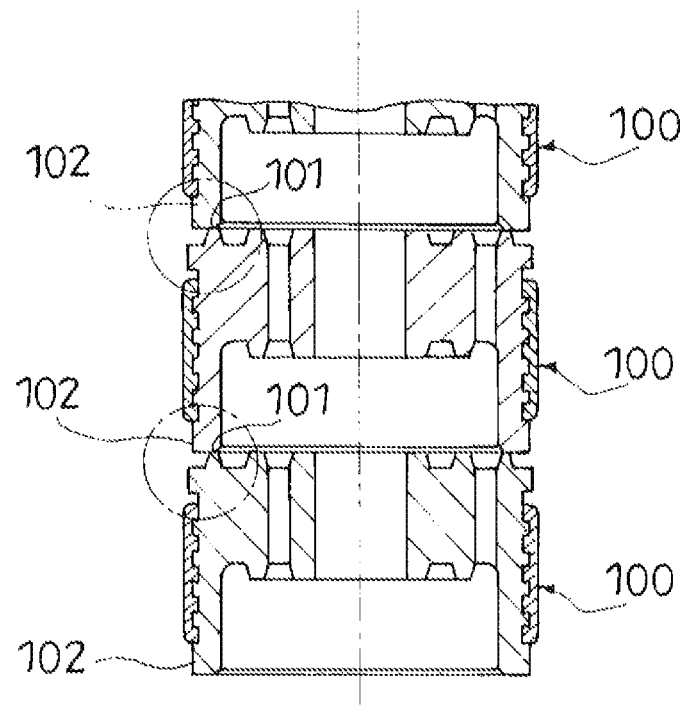
FIG. 5 is a vertical cross sectional view showing a state in which pistons are vertically stacked in a comparative example.

Furthermore, the piston 1 includes a piston body 10 including the sheet surface 19, and a piston ring 11 attached on the outer circumference of the piston body 10 by mold formation. In a case in which a plurality of the piston bodies 10 are stacked and are pushed inside the heating cylinder H for the mold formation, in a state in which the leg part 102 are in contact with the sheet surface 101, the leg part 102 will be strongly pressed to the sheet surface 101 as shown in the comparative example in FIG. 5 and thus may damage the sheet surface 101.

On the other hand, with the piston 1 of the present embodiment, the leg part 10b avoids the sheet surface 19 and comes into contact with the supporting part 20; this allows for preventing the damaging of the sheet surface 19. Furthermore, in this case, it is preferable to make the leg part 10b come into contact with the flange part 20b for stabilization and/or to enlarge the contact area between the leg part 10b and the supporting part 20, when the pistons 1 are stacked.

Furthermore, the piston 1 is utilized in a shock absorber D. The shock absorber D includes a tubular cylinder 2, a piston rod 3 to be inserted movable in an axial direction within the cylinder 2, a piston 1 retained by the piston rod 3 and which comes slidably in contact with an inner circumference surface of the cylinder 2, an expansion chamber 4 and compression chamber 5 (two chambers) defined within the cylinder 2 and partitioned by the piston 1, in which working fluid is filled, a compression passage (passage) 17 formed to the piston 1 and communicating the expansion chamber 4 with the compression chamber 5 (two chambers), and an annular plate shaped compression leaf valve (leaf valve) 7 stacked on the expansion chamber side (the one side) of the piston 1 and which applies resistance to the working fluid flowing through the compression passage 17. The shock absorber D generates a damping force caused by resistance of the compression leaf valve 7.

Therefore, although there is a chance that the damping force would vary if the sheet surface 19 on which the compression leaf valve 7 is seated becomes damaged and working fluid leaks from this damaged part, in the present embodiment, the leg part 10b avoids the sheet surface 19 and comes into contact with the supporting part 20 when the pistons 1 are stacked, thus allowing for protecting the sheet surface. Moreover, it is possible to axially stack the pistons 1 while preventing any damages to the sheet surface 19, which thus allows for improving the convenience in storage and carriage of the pistons 1 serving as parts of the shock absorber D, in the manufacture of the shock absorber D.

Embodiments of the present invention were described above, but the above embodiments are merely examples of applications of the present invention, and the technical scope of the present invention is not limited to the specific constitutions of the above embodiments.

For example, the configuration, shapes, formation methods of the piston 1 are not limited to the above.

Moreover, the piston ring 11 may be attached to the piston body 10 by a method other than mold formation.

Furthermore, one or more notches may be provided to the edge part 21 of the leg part 10b or the flange part 20b of the supporting part 20.

Figure 4:
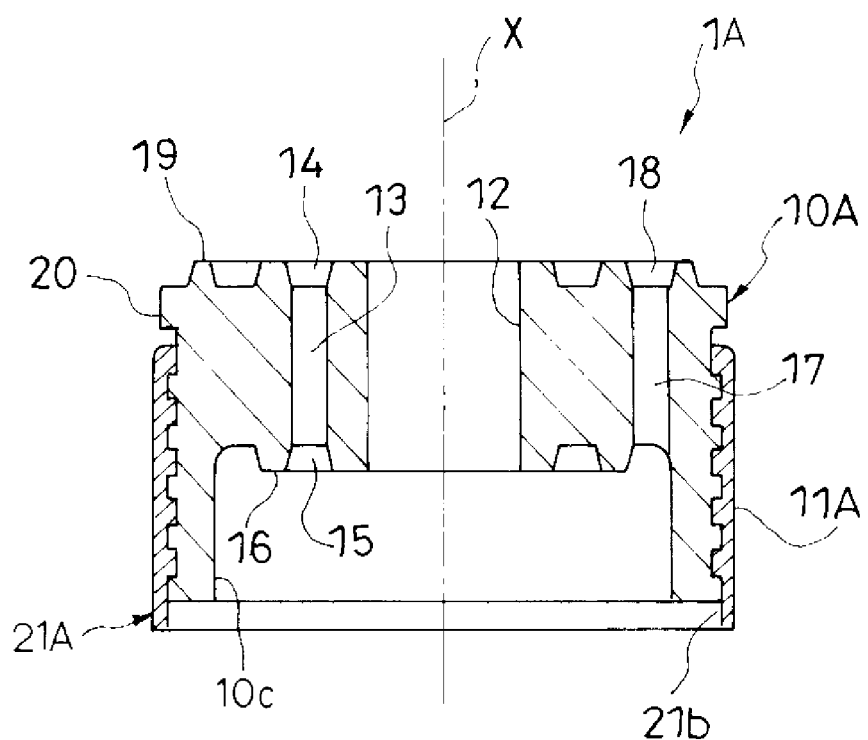
FIG. 4 is a vertical cross sectional view showing an enlargement of a modification of a piston according to an embodiment of the present invention.

Furthermore, as shown in FIG. 4, a piston 1A may be employed, in which a piston ring 11A is projected to a mid-lower side of FIG. 4 from a piston body 10A. In this piston 1A, a leg part 10c is constructed of the piston body 10A and the piston ring 11A, and an edge part 21A of the leg part 10c is constructed of the piston ring 11A projecting from the piston body 10A. Therefore, in the piston 1A, it is possible to use a level difference part 21b between the piston ring 11A and the piston body 10A as the depression in the piston 1 of the above embodiment.

This application claims priority based on Japanese Patent Application No. 2013-020962 filed with the Japan Patent Office on Feb. 6, 2013, the entire contents of which are incorporated into this specification.

The invention claimed is:

1. An annular piston on which an annular plate shaped leaf valve is stacked on a one side of the piston in an axial direction, the piston comprising:
   a sheet surface on which the leaf valve is seated, the sheet surface being formed on the one side of the piston;
   a leg part formed on an outer circumference part of an other side of the piston in the axial direction, the leg part standing along a circumferential direction of the outer circumference part, the leg part being constructed of a piston body including the sheet surface, and the leg part defining a depression on an inner circumferential surface of an edge part of the leg part;
   a supporting part provided on the outer circumference of the sheet surface along the circumferential direction, the supporting part having a slope part extending from the sheet surface towards the other side of the piston to an outer circumference side in an inclining manner and a flange part extending outwards from an outer circumference of the slope part; and
   a piston ring attached to an outer circumference of the piston body,
   wherein the piston is configured to be capable of being stacked on another piston, and is configured such that stacking the piston on the another piston places an axially-facing end face of the leg part of the piston in contact with only an axially-facing surface of a flange part of a supporting part of the another piston, such that the leg part of the piston is spaced apart from a slope part of the supporting part of the another piston without contacting the slope part of the supporting part of the another piston, and the slope part of the supporting part and a sheet surface of the another piston is contained inside the depression of the piston,
   wherein the flange part extends in a perpendicular direction with respect to a center line of the piston, is positioned on the outer circumference of the sheet surface along the circumferential direction, and is formed so as to project out towards the outer circumference side of the piston,
   the depression and the flange part are positioned on a circumference of a concentric circle whose center is on the center line, an inner diameter of the edge part of the leg part is equal to or more than an inner diameter of the flange part, and an axial length of the depression is longer than an axial length of the sheet surface projecting out from the flange part, and
   wherein the edge part of the leg part is formed so as to project out towards the outer circumference side of the piston.

2. The piston according to claim 1, wherein the edge part of the leg part and the flange part are shaped annularly.

3. The piston according to claim 1, wherein the piston ring is attached to the outer circumference of the piston body by mold formation.

4. A shock absorber comprising a piston as set forth in claim 1, the shock absorber comprising:
   a tubular cylinder;
   a piston rod to be inserted movable in an axial direction within the cylinder;
   the piston retained by the piston rod, being slidably in contact with an inner circumference surface of the cylinder;
   two chambers defined within the cylinder and partitioned by the piston, being filled with working fluid;
   a passage formed to the piston and communicating the two chambers; and
   the annular plate shaped leaf valve adapted to apply resistance to working fluid flowing through the passage,
   wherein damping force is generated due to resistance of the leaf valve.

5. An annular piston on which an annular plate shaped leaf valve is stacked on a one side of the piston in an axial direction, the piston comprising:
   a sheet surface on which the leaf valve is seated, the sheet surface being formed on the one side of the piston;
   a leg part formed on an outer circumference part of an other side of the piston in the axial direction, the leg part standing along a circumferential direction of the outer circumference part, the leg part being constructed of a piston body including the sheet surface, and the leg part defining a depression on an inner circumferential surface of an edge part of the leg part;
   a supporting part provided on the outer circumference of the sheet surface along the circumferential direction, the supporting part having a slope part extending from the sheet surface towards the other side of the piston to an outer circumference side in an inclining manner and a flange part extending outwards from an outer circumference of the slope part; and
   a piston ring attached to an outer circumference of the piston body,
   wherein the piston is configured to be capable of being stacked on another piston, and is configured such that stacking the piston on the another piston places the leg part of the piston in contact with a supporting part of the another piston, and a sheet surface of the another piston is contained inside the depression of the piston,
   wherein the flange part extends in a perpendicular direction with respect to a center line of the piston, is positioned on the outer circumference of the sheet surface along the circumferential direction, and is formed so as to project out towards the outer circumference side of the piston,
   the depression and the flange part are positioned on a circumference of a concentric circle whose center is on the center line, an inner diameter of the edge part of the leg part is equal to or more than an inner diameter of the flange part, and a first axial length of the depression is longer than a second axial length of the sheet surface projecting out from the flange part,
   wherein the edge part of the leg part is formed so as to project out towards the outer circumference side of the piston,
   wherein the piston ring is provided so as to extend in an axial direction along a first portion of the leg part, the first portion having a third axial length, and
   the first portion of the leg part has a constant inner diameter along the third axial length.

* * * * *